United States Patent [19]

Miyagawa

[11] Patent Number: 4,542,391

[45] Date of Patent: Sep. 17, 1985

[54] INK JET RECORDING HEAD

[75] Inventor: Akira Miyagawa, Tanashi, Japan

[73] Assignee: Canon Kabushiki Kaisha, Tokyo, Japan

[21] Appl. No.: 546,413

[22] Filed: Oct. 28, 1983

[30] Foreign Application Priority Data

Nov. 9, 1982 [JP] Japan ................................ 57-197239

[51] Int. Cl.⁴ ....................... G01D 15/18; F16K 17/38; G05D 27/00

[52] U.S. Cl. .................................. 346/140 R; 346/75; 137/468; 236/87; 236/92 R

[58] Field of Search ............. 346/75, 140 R; 137/468; 236/92 R, 87

[56] References Cited

U.S. PATENT DOCUMENTS 2,587,879 3/1952 Nash ................................ 166/62 X
3,106,225 10/1963 Spurling ............................ 138/45 X
3,286,741 11/1966 Gellman .............................. 137/468
4,346,388 8/1982 Wiley .................................... 346/75
4,388,630 6/1983 Osaki et al. ...................... 346/140 R
4,417,689 11/1983 Sasaki ............................... 236/92 R

*Primary Examiner*—E. A. Goldberg
*Assistant Examiner*—Gerald E. Preston
*Attorney, Agent, or Firm*—Fitzpatrick, Cella, Harper & Scinto

[57] ABSTRACT

An ink jet recording head is constructed with a liquid droplet discharging device, a feeding path for supplying ink to the liquid droplet discharging device, and a flow path resistance adjusting section formed in one part of the ink feeding path to increase the flow path resistance in the ink feeding path due to a rise in temperature and to decrease the flow path resistance in the ink feeding path due to a fall in the temperature.

8 Claims, 7 Drawing Figures

INK JET RECORDING HEAD

BACKGROUND OF THE INVENTION

1. Field of the Invention

This invention relates to an ink jet recording head which ejects ink droplets to form images on a recording material, and, more particularly, it is concerned with an "ink-on-demand" type ink jet recording head of an improved construction.

2. Description of the Prior Art

FIG. 1 of the accompanying drawing schematically illustrates a conventional "ink-on-demand" type ink jet recording head. In this ink jet recording head, ink is supplied from an ink tank (not shown in the drawing) through a feeding tube 1 into a common liquid chamber 2, from which the ink is further led into an ink discharge flow path 3 of a narrow width. At one portion of the inner bottom surface of this ink discharge flow path 3, there is disposed an electro-thermal energy transducing element 4, at which the ink receives heat as the energy for the ink ejection, and is expelled from an opening 5 at the distal end of the flow path in the form of a droplet 6. (It is to be noted that the drawing does not show signal lines and other component elements for the electro-thermal energy transducing element.) In this "ink-on-demand" type ink jet recording head, feeding of the ink into the discharge flow path 3 by application of a pressure to it is difficult as a practical matter because, among other reasons, that the discharge energy is small. Therefore, ink feeding into the discharge flow path 3 has been effected mainly by the capillary action of the discharge flow path 3 and the surface tension at the opening 5.

According to this manner of ink supply, however, since the force available for supplying ink into the discharge flow path 3 is weak, its feeding quantity decreases due, for example, to a temperature reduction, etc., which makes it unable to keep up with the outlet quantity of the ink from the opening 5 of the flow path 3, thereby causing irregularity in the size of the ink droplets or inability to eject ink. The causes for such troubles will be described in detail in the following.

It has generally been known that, if the viscosity and surface tension of ink are constant, the speed and quantity of ink feeding into the ink discharge flow path 3 assume certain values determined by a constant K of the shape of the ink droplet, a width W, a length L, and a height H of the ink flow path 3.

These values constitute important factors for determining the ink ejection frequency from the ink jet recording head, hence maintenance of constant and appropriate values of these factors is one of the essential requirements for ejecting the ink droplets in an adequate size and a same shape. Usually, however, the ink to be used for this kind of recording head has viscosity-versus-temperature curve as shown in FIG. 2 of the accompanying drawing. In this graphical representation, the ink abruptly increases its viscosity at a temperature lower than about 15° C. to assume a viscosity value which is far removed from a desired viscosity level, and, at a temperature of 5° C. or in its vicinity, the viscosity becomes several times as high as that of the ordinary level. This means that the ink jet recording head having the flow path of constant width W, length L, and height H significantly changes its ejection frequency to a large extent, which causes irregular dot diameter, inability of ink ejection, and other troubles.

On account of this, various measures were taken in the conventional ink jet recording head such that a back-up system is provided in the ink jet recording head, by which a temperature of the whole system is controlled to maintain the ink in its desired viscosity, or a display device is provided to indicate the inability of the ink jet recording head to operate. With such measures being taken, however, as a matter of practice, the inability of use of the ink jet recording head at a low temperature or a high temperature condition gives rise to serious problems, and the installation of the back-up system also brings about various difficult problems such as increase in the manufacturing cost of the apparatus, maintenance of the apparatus, and so forth.

SUMMARY OF THE INVENTION

It is a primary object of the present invention to provide an ink jet recording head of a simple construction and being capable of ejecting ink constantly and stably irrespective of the temperature changes.

The foregoing object, other objects as well as the specific construction and function of the ink jet recording head according to the present invention will become more apparent and understandable from the following detailed description thereof, when read in conjunction with the accompanying drawing.

DETAILED DESCRIPTION OF THE PREFERRED EMBODIMENT

In the following, the present invention will be described specifically in reference to the accompanying drawing illustrating a few preferred embodiments of the ink jet recording head according to the present invention.

Figure 1:
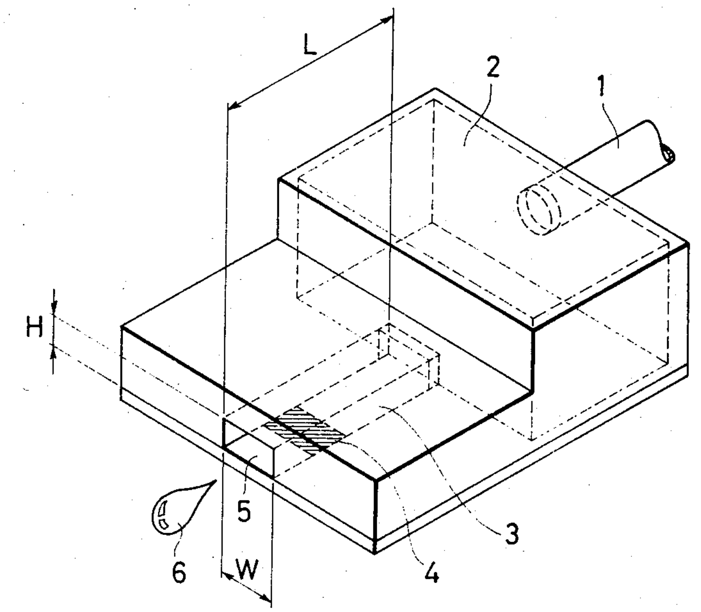
FIG. 1 PRIOR ART
FIG. 1 is a perspective view of a conventional ink jet recording head.
Figure 2:
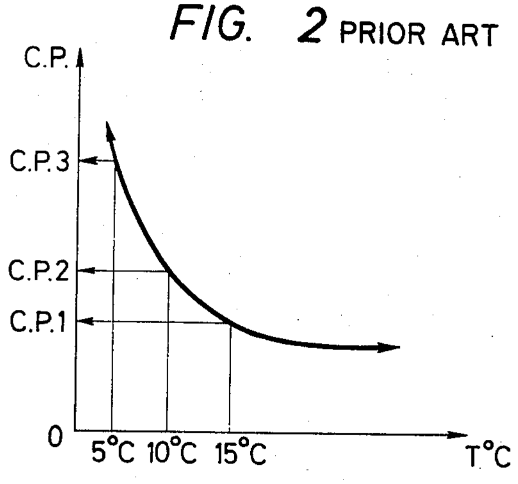
FIG. 2 PRIOR ART
FIG. 2 is a graphical representation showing a relationship between viscosity of ink and temperature.
Figure 3:
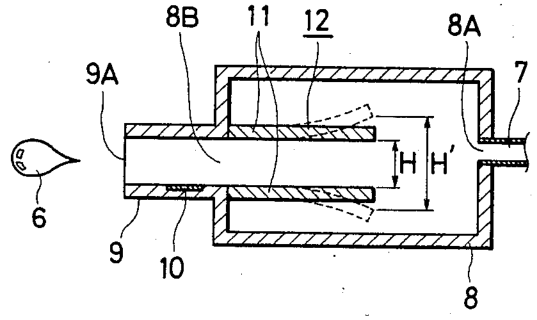
FIG. 3 is a longitudinal cross-sectional view of one embodiment of the ink jet recording head according to the present invention.

Referring to FIG. 3 showing a first embodiment of the ink jet recording head according to the present invention, liquid ink supplied from a main ink tank (not shown) as an ink feeding source is introduced into a liquid chamber 8 through a tube 7. At the front end wall of the liquid chamber 8, there is formed a projecting tubular ink discharge flow path 9 in a rectangular cross-sectional shape. Further, at one part of the inner bottom surface of the ink discharge flow path 9, there is provided an electrothermal energy transducing element 10. This transducing element 10 generates heat by application of drive signals from a driver circuit (not shown) and ejects the ink within the flow path 9 from an opening 9A at its distal end in the form of a liquid droplet 6. Both liquid chamber 8 and ink discharge flow path 9 are integrally formed of glass or synthetic resin materials which are less easily subjected to expansion and contraction due to temperature changes. The liquid chamber 8 has an opening 8A formed therein for its connection with the tube 7 and a discharge opening 8B for sending the ink into the ink discharge flow path 9. The cross-sectional area of the liquid chamber 8 is taken sufficiently larger than the cross-sectional areas of the openings 8A and 8B. A flow path resistance adjusting section 12 is fixedly provided at a position around and inside the opening 8B. This flow path resistance adjusting section 12 serves to change the resistance against the flow of ink through the flow path in accordance with variations in temperature so that the flow rate of the ink to be emitted from the ink discharge flow path 9 may always be kept constant irrespective of the temperature variations. The flow path resistance adjusting section 12 communicatively connects the ink tank and the ink discharge flow path 9 along with the tube 7 and the liquid chamber 8, whereby it comprises a part of the ink feeding path connecting the ink tank and the ink discharge flow path. This flow path resistance adjusting section 12 is in a tubular form, the upper and lower walls 11, 11 of which are made of a bimetal. A space interval H between the upper and lower walls 11, 11 is substantially same as the height of the flow path 9 at a normal temperature, and their free ends become wider as the temperature goes down, as shown with broken lines in FIG. 3, while they become narrower as the temperature goes up. The side walls holding their upper and lower walls 11, 11 in their positions are made of synthetic resins or the like having good expanding and contracting properties. As such, the free ends of the flow path resistance adjusting section 12 become automatically widened as the temperature goes down to increase the cross-sectional area of that section, thereby reducing the resistance in the flow path. On the contrary, as the temperature goes up, the flow path resistance adjusting section 12 reduces its cross-sectional area to increase the flow path resistance, whereby the resistance to ink flowing through the ink discharge flow path changes automatically, and the variations in the ink discharge quantity from the distal end of the ink discharge flow path 9 due to variations in viscosity of the ink is compensated, and, as the result, stable ink discharge can always be secured irrespective of the temperature variations.

Figure 4:
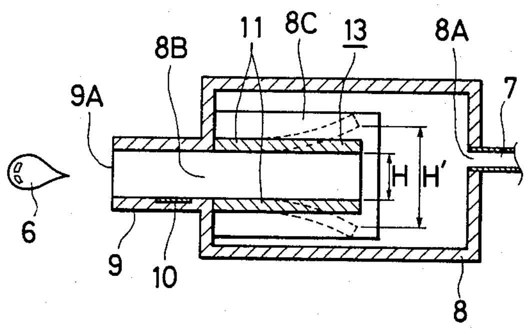
FIG. 4 is a longitudinal cross-sectional view of another embodiment of the ink jet recording head according to the present invention.
Figure 5:
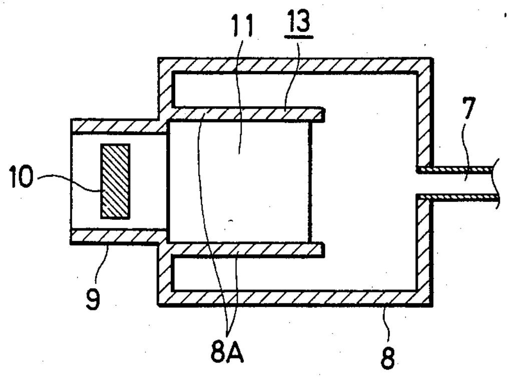
FIG. 5 is a plan view in cross-section showing a second embodiment according to the present invention.

FIGS. 4 and 5 illustrate the second embodiment of the ink jet recording head according to the present invention. In this embodiment, the side surfaces of the upper and lower walls 11, 11 of the flow path resistance adjusting section 13 are in frictional contact with the side walls 8C, 8C integrally formed with the liquid chamber 8. The relation between the upper and lower walls 11, 11 and the side walls 8C, 8C is such that it is possible for the upper and lower walls to deform sufficiently.

Figure 6:
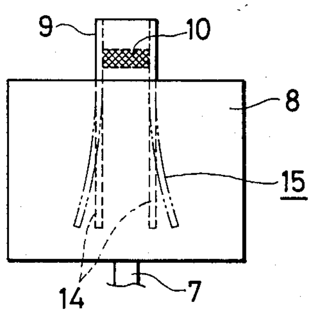
FIG. 6 is a top plan view of a third embodiment of the ink jet recording head according to the present invention.
Figure 7:
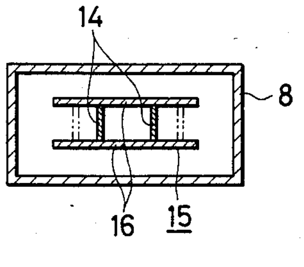
FIG. 7 is a front view, in cross-section of the third embodiment according to the present invention.

FIGS. 6 and 7 illustrate the third embodiment of the ink jet recording head according to the present invention, wherein the side walls 14, 14 of the flow path resistance adjusting section 15 are made of a bimetal, and the upper and lower walls 16, 16 of a synthetic resin material which can expand and contract freely.

In the above-described first, second and third embodiments of the ink jet recording head according to the present invention, the wall surface of the flow path resistance adjusting section, which deforms due to the temperature variations, is made of a bimetal. It should however be noted that, in place of the bimetal, there may also be used a shape memory alloy. Also, the flow path resistance adjusting section may take a cylindrical form instead of the rectangular form. Further, the flow path resistance adjusting section need not be in the liquid chamber interior, but it can be formed as a part of the ink discharge flow path. Moreover, the ink jet recording head of the above-described embodiments has only one ink discharge port, but it may of course have a plurality of ink discharge ports. Furthermore, the ink jet recording head in the above-described embodiments uses an electro-thermal energy transducing element as the ink liquid droplet forming element, although it may also utilize a electro-mechanical energy transducing element such as the so-called "piezo" element.

As mentioned in the foregoing, the present invention makes it possible to stabilize the flow rate of the ink to be fed into the ink discharge flow path even under the varying temperature conditions. In addition, since its structure has been made simplier, the manufacturing cost of the same can be remarkably reduced in comparison with the conventional ink jet recording head.

What I claim is:

1. An ink jet recording head, comprising:

liquid droplet discharging means for discharging ink liquid droplets upon application of electrical signals;

an ink feeding path for supplying ink to said liquid droplet discharging means; and a flow path resistance adjusting section including a tubular member having a free end provided within a part of said ink feeding path located at or proximate to said liquid droplet discharging means for increasing the flow resistance in said part of said ink feeding path due to a rise in the ink temperature and decreasing the flow resistance in said part of said ink feeding path due to a decrease in the ink temperature by varying the cross-sectional area of said free end of said tubular member with temperature changes.

2. The ink jet recording head as set forth in claim 1, wherein said ink feeding path includes a liquid chamber for temporarily storing ink from an ink feeding source, and said flow path resistance adjusting section includes a tube projecting into said liquid chamber.

3. The ink jet recording head as set forth in claim 1, wherein said flow path resistance adjusting section is made of a bimetal.

4. The ink jet recording head as set forth in claim 1, wherein said flow path resistance adjusting section is made of a shape memory alloy.

5. The ink jet recording head as set forth in claim 1, wherein said tubular member has a rectangular cross-section.

6. An ink jet recording head, comprising:

a discharge opening section for discharging ink in the form of droplets;

a liquid chamber for accepting ink from an ink feeding source and providing the ink to said discharge opening section; and a tubular member in said liquid chamber located at or proximate to said discharge opening section, said tubular member having one end thereof fixed in said chamber and the other end thereof free, wherein said free end becomes narrower with an increase in temperature and wider with a decrease in temperature.

7. The ink jet recording head as set forth in claim 6, wherein said tubular member has a rectangular cross-section.

8. The ink jet recording head as set forth in claim 6, wherein said one end of said tubular member is fixed at and around an ink forwarding opening in said liquid chamber, which opening is connected for fluid communication with said discharge opening section.

* * * * *

UNITED STATES PATENT AND TRADEMARK OFFICE

CERTIFICATE OF CORRECTION

PATENT NO. : 4,542,391

DATED : September 17, 1985

INVENTOR(S) : AKIRA MIYAGAWA

It is certified that error appears in the above-identified patent and that said Letters Patent is hereby corrected as shown below:

Column 1, line 58, after "has" insert --a--.

Column 3, line 32, change "their" to --the--.

Column 4, line 23, change "simplier" to --simpler--.

Signed and Sealed this

*Twenty-sixth* Day of *August 1986*

[SEAL]

*Attest:*

DONALD J. QUIGG

*Attesting Officer* *Commissioner of Patents and Trademarks*